US012786670B2

(12) United States Patent
Baek et al.

(10) Patent No.: US 12,786,670 B2
(45) Date of Patent: Nov. 3, 2026

(54) METHOD AND DEVICE FOR TERMINAL TO JOIN MULTICAST SERVICE

(71) Applicant: SAMSUNG ELECTRONICS CO., LTD., Suwon-si (KR)

(72) Inventors: Youngkyo Baek, Suwon-si (KR); Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 18/259,013

(22) PCT Filed: Dec. 22, 2021

(86) PCT No.: PCT/KR2021/019633
§ 371 (c)(1),
(2) Date: Jun. 22, 2023

(87) PCT Pub. No.: WO2022/139470
PCT Pub. Date: Jun. 30, 2022

(65) Prior Publication Data
US 2024/0048946 A1 Feb. 8, 2024

(30) Foreign Application Priority Data
Dec. 24, 2020 (KR) ........................ 10-2020-0183788

(51) Int. Cl.
*H04W 72/04* (2023.01)
*H04W 4/06* (2009.01)
(Continued)

(52) U.S. Cl.
CPC ............ *H04W 4/06* (2013.01); *H04W 36/22* (2013.01); *H04W 48/16* (2013.01)

(58) Field of Classification Search
CPC ....... H04W 4/06; H04W 36/22; H04W 48/16; H04W 88/14; H04W 76/12; H04W 76/40;
(Continued)

(56) References Cited

U.S. PATENT DOCUMENTS

2014/0098733 A1 4/2014 Park
2019/0223250 A1* 7/2019 Dao ...................... H04W 72/23
(Continued)

FOREIGN PATENT DOCUMENTS

CN 110366131 A 10/2019
CN 111491346 A 8/2020
(Continued)

OTHER PUBLICATIONS

Supplementary European Search Report dated Mar. 20, 2024, in connection with European Patent Application No. 21911537.5, 9 pages.

(Continued)

*Primary Examiner* — Lan-Huong Truong

(57) ABSTRACT

Disclosed are a method and device for a terminal to join a multicast service. A method performed by a session management function (SMF) may comprise the operations of: receiving a join request message for a terminal to join a multicast service; transmitting, to an NF repository function (NRF), a discovery request message including a multicast/broadcast service (MBS) session ID related to the multicast service; receiving a discovery response message from the NRF in response to the discovery request message, the discovery response message including an MB-SMF ID mapped to the MBS session ID; acquiring, from an MB-SMF identified by the MB-SMF ID, information about an MBS session indicated by the MBS session ID; and notifying a radio access network (RAN), to which the terminal
(Continued)

connects, of information related to the MBS session, on the basis of the acquired information.

15 Claims, 8 Drawing Sheets

(51) Int. Cl.
*H04W 36/22* (2009.01)
*H04W 48/16* (2009.01)

(58) Field of Classification Search
CPC ....... H04W 76/11; H04W 88/18; H04L 67/14; H04L 65/1046; H04L 65/1069; H04L 65/1096; H04L 65/611; H04L 67/146; H04L 67/141
See application file for complete search history.

(56) References Cited

U.S. PATENT DOCUMENTS

| | | | | |
|---|---|---|---|---|
| 2021/0022063 | A1 | 1/2021 | Yang | |
| 2021/0105196 | A1* | 4/2021 | Dao | H04L 47/24 |
| 2021/0281981 | A1 | 9/2021 | Li | |
| 2021/0368427 | A1 | 11/2021 | Rommer | |
| 2023/0362740 | A1* | 11/2023 | Schliwa-Bertling | H04W 36/0016 |

FOREIGN PATENT DOCUMENTS

| | | | |
|---|---|---|---|
| KR | 10-1910459 | B1 | 1/2019 |
| KR | 2020-0134278 | A | 12/2020 |
| WO | 2019/161927 | A1 | 8/2019 |
| WO | 2019193129 | A1 | 10/2019 |
| WO | 2020108022 | A1 | 6/2020 |
| WO | 2021/091307 | A1 | 5/2021 |

OTHER PUBLICATIONS

Nokia et al., "KI#1: Conclusion update," 3GPP TSG-WG SA2 Meeting #142E, e-meeting, Elbonia, Nov. 2020, S2-200220 (revision of S2-2009000r06), 8 pages.
Qualcomm Incorporated, "New Solution to Key Issue #1 for Broadcast Service," 3GPP TSG-WG SA2 Meeting #140E, e-meeting, Elbonia, Oct. 2020, S2-2007688, 5 pages.
International Search Report and Written Opinion of the International Searching Authority dated Mar. 25, 2022, in connection with International Application No. PCT/KR2021/019633, 10 pages.
3GPP TR 23.757 V1.2.0 (Nov. 2020) Technical Report; 3rd Generation Partnership Project; Technical Specification Group Services and System Aspects; Study on architectural enhancements for 5G multicast-broadcast services (Release 17); 293 pages.
Office Action issued Mar. 26, 2026, in connection with Chinese Patent Application No. 202180085880.5, 20 pages.

* cited by examiner

METHOD AND DEVICE FOR TERMINAL TO JOIN MULTICAST SERVICE

CROSS-REFERENCE TO RELATED APPLICATIONS

This application is a U.S. National Phase Entry of PCT international Application No. PCT/KR2021/019633, which was filed on Dec. 22, 2021, and claims priority to Korean Patent Application No. 10-2020-0183788, which was filed on Dec. 24, 2020 in the Korean Intellectual Property Office, the contents of which are incorporated herein by reference.

TECHNICAL FIELD

The disclosure relates to the field of a mobile communication system providing a data service through multicast/broadcast, and relates to a method and device for supporting a multicast service for a UE.

BACKGROUND ART

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, when a multicast-broadcast service (MBS) is provided to a UE in a 5G network, a need for discovering and selecting an appropriate network entity in an operation in which the UE joins the multicast service is emerging.

DETAILED DESCRIPTION OF THE INVENTION

Problem to be Solved

To transmit the same data to a plurality of UEs in a mobile communication network, it is necessary to provide a multicast and/or broadcast service (MBS). For example, a need exists for transmitting data via multicast/broadcast to provide a TV/audio service, a vehicle-to-everything (V2X) service, or a massive consumer Internet of things (CIoT) service to multiple UEs in a specific area.

To transmit data through multicast/broadcast, network functions (NFs) or NF services need to be defined, and relevant multicast/broadcast service (MBSs) procedures, such as exposing, discovering, or selecting each NF or NF service, may be supported.

In the case of a multicast service, while a UE joins the multicast service, a network entity that receives a join request from the UE, e.g., a session management function (SMF) or an access and mobility management function (AMF), needs to select an appropriate MBS entity, e.g., multicast/broadcast session management function (MB-SMF), and obtain information for providing a multicast service. Therefore, a method for discovering and selecting an MB-SMF supporting multicast service is required.

Technical Solution

According to an embodiment, a method performed by a session management function (SMF) for a UE to join a multicast service may comprise receiving a join request message for joining the multicast service for the UE, transmitting a discovery request message including a multicast/broadcast service (MBS) session ID related to the multicast service to a network function (NF) repository function (NRF), receiving, from the NRF, a discovery response message including a multicast/broadcast (MB)-SMF ID mapped to the MBS session ID in response to the discovery request message, obtaining information about a MBS session indicated by the MBS session ID from an MB-SMF identified by the MB-SMF ID, and notifying a radio access network (RAN) accessed by the UE of information related to the MBS session based on the obtained information.

According to an embodiment, a method performed by a multicast/broadcast session management function (MB-SMF) for a UE to join a multicast service may comprise creating an MBS session having a MBS session ID for providing a multicast service, transmitting, to a network function (NF) repository function (NRF), a request message requesting to store an MB-SMF ID identifying the MB-SMF for the MBS session ID, requesting a multicast/broadcast user plane function (MB-UPF) to set a tunnel to be used to transfer data traffic for the MBS session, and transmitting an ingress address for the MBS session received from the MB-UPF to an application function (AF) providing the multicast service.

According to an embodiment, a device of a session management function (SMF) supporting a UE to join a multicast service may comprise a transceiver and a controller coupled with the transceiver. The controller may be configured to receive a join request message for joining the multicast service for the UE, transmit a discovery request message including a multicast/broadcast service (MBS) session ID related to the multicast service to a network function (NF) repository function (NRF), receive, from the NRF, a discovery response message including a multicast/broadcast (MB)-SMF ID mapped to the MBS session ID in response to the discovery request message, obtain information about a MBS session indicated by the MBS session ID from an MB-SMF identified by the MB-SMF ID, and notify a radio access network (RAN) accessed by the UE of information related to the MBS session based on the obtained information.

According to an embodiment, a device of a multicast/broadcast session management function (MB-SMF) supporting a UE to join a multicast service may comprise a transceiver and a controller coupled with the transceiver. The controller may be configured to create a multicast/broadcast service (MBS) session having a MBS session ID for providing a multicast service, transmit, to a network function (NF) repository function (NRF), a request message requesting to store an MB-SMF ID identifying the MB-SMF for the MBS session ID, request a multicast/broadcast user plane function (MB-UPF) to set a tunnel to be used to transfer data traffic for the MBS session, and transmit an ingress address for the MBS session received from the MB-UPF to an application function (AF) providing the multicast service.

Advantageous Effects

According to various embodiments, it is possible to provide an efficient method for discovering and selecting an MB-SMF supporting the multicast service in a network entity when a UE of a 5G system joins a multicast service and to smoothly obtain information for a multicast service.

MODE FOR CARRYING OUT THE INVENTION

Hereinafter, the operational principle of embodiments of the disclosure is described below with reference to the accompanying drawings. When determined to make the subject matter of the disclosure unclear, the detailed description of known functions or configurations may be skipped in describing embodiments of the disclosure. The terms as used herein are defined considering the functions in the present disclosure and may be replaced with other terms according to the intention or practice of the user or operator. Therefore, the terms should be defined based on the overall disclosure.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited by the terms, and such terms may be replaced with other terms denoting objects with equivalent technical concept.

For ease of description, the disclosure adopts terms and names defined in 5G system standards. However, the disclosure is not limited by such terms and names and may be likewise applicable to systems conforming to other standards.

Figure 1:
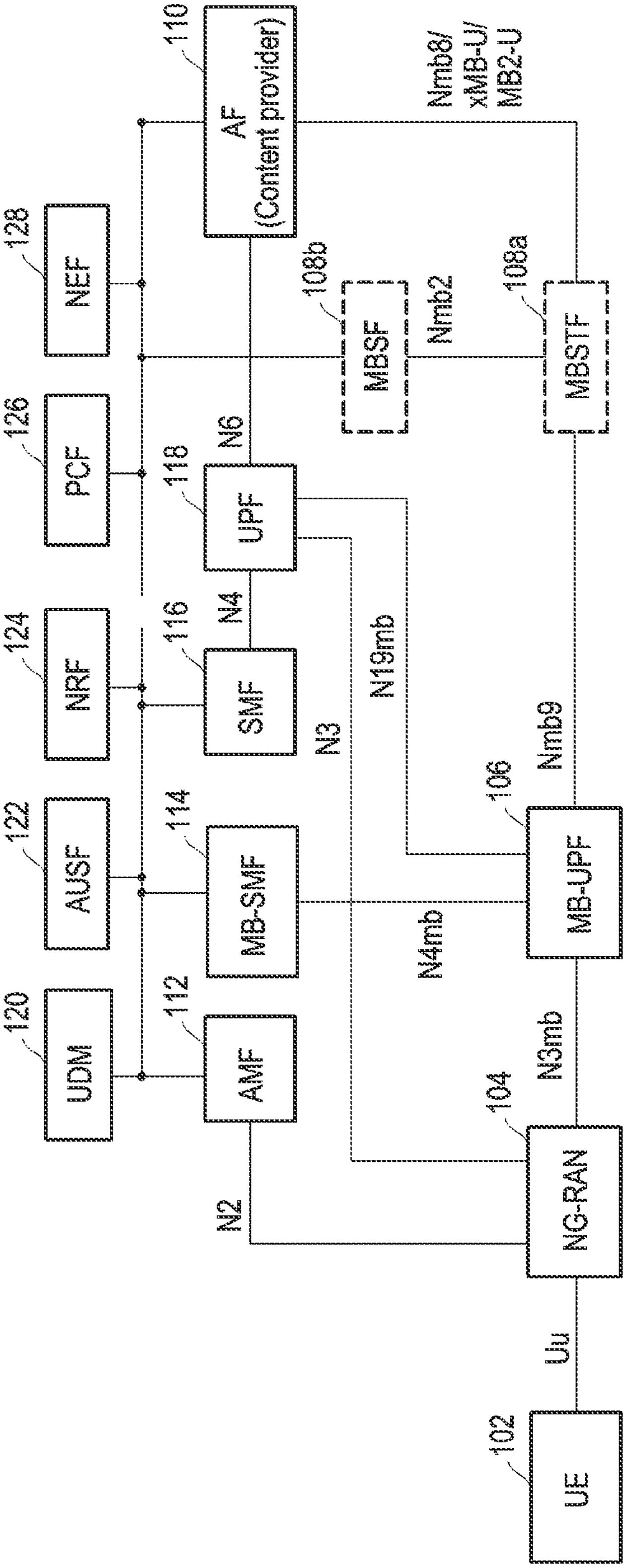
FIG. 1 is a view illustrating an example of a structure of a cellular system for an MBS service according to an embodiment.

FIG. 1 is a view illustrating an example of a structure of a cellular system for an MBS service according to an embodiment. FIG. 1 shows the structure of a 5G system (5GS), for example.

Referring to FIG. 1, a cellular system may include a user equipment (UE) 102 and one or more network function (NF) entities. The one or more NFs may include at least one of, e.g., an NG radio access network (NG-RAN) 104 operating as a base station, an access and mobility management function (AMF) entity 112, a multicast/broadcast user plane function (MB-UPF) entity 106, a multicast/broadcast session management function (MB-SMF) entity 114, a policy control function (PCF) entity 126, a session management function (SMF) entity 116, a network exposure function (NEF) entity 128, a multicast/broadcast service function (MBSF) entity **108*b*, a multicast/broadcast service traffic function (MBSTF) entity 108*a*, an application function (AF) entity 11030 that may act as a content provider (CP) or application server (AS), a unified data management (UDM) entity 120, a user plane function (UPF) entity 118, an authentication server function (AUSF) entity 122, or an NF repository function (NRF) entity 124. In some embodiments, the SMF 116 and MB-SMF 114 may be co-located or separately deployed. In some embodiments, the UPF 118 and the MB-UPF 106** may be co-located or separately disposed.

In describing FIG. 1, each network function (NF) of 5GS will be described as a "network function entity" or "network function" per se. However, it will be appreciated by one of ordinary skill in the art that the NF and/or the NF device may be implemented in one or more specific devices (e.g., servers), or two or more NFs performing the same operation may be implemented in one server.

One NF or two or more NFs may be implemented as a single network slice in some cases. These network slices may be created based on specific purposes. For example, it may be set for a subscriber group to provide the same type of service, such as maximum transmission rate, data usage, guaranteed minimum transmission rate, and the like, to specific subscriber groups. Further, network slices may be implemented for various purposes. Here, additional description of the network slice will be omitted.

FIG. 1 illustrates the interface between nodes. A Uu interface may be used between the UE 102 and the NG-RAN 104. An N2 interface may be used between the NG-RAN 104 and the AMF 112. An N3 interface may be used between the NG-RAN 104 and the UPF 118. An N3mb interface may be used between the NG-RAN 104 and the MB-UPF 106. An N4mb interface may be used between the MB-UPF 106 and the MB-SMF 114. An N19mb interface may be used between the MB-UPF 106 and the UPF 118. An N4 interface may be used between the SMF 116 and the UPF 118. An N6mb interface may be used between the MB-UPF 106 and the AF 110. An Nmb2 interface may be used between the MBSF **108*b* and the MBSTF 108*a*. An Nmb9 interface may be used between the MB-UPF 106 and the MBSTF 108*a*. An Mmb8/xMB-U/MB2-U interface may be used between the AF 110 and the MBSTF 108*a*21**.

These interfaces may refer to the definitions in the NR standard specifications (e.g., 3GPP TS 23.247).

To support an MBS service in 5GS in an embodiment, a cellular system for MBS may be configured of the following NFs and services.

The AF 110 may be, e.g., a V2X application server, a cellular Internet of things (CIoT) application server, a mission-threshold push-to-talk (MCPTT) application, a contents provider, a TV service provider, an audio service provider, or a streaming video service provider.

The AF 110 may request the MBSF 108*b*, which manages the MBS service session and controls traffic to provide an MBS service, to provide an MBS service. The MBSF 108*b* may receive a request for an MBS service from the AF 110, and manage the MBS service session related to the MBS service and control MBS data traffic related to the MBS service. The MBSTF 108*a* may receive media (or media data) related to MBS service from an AF 110 (e.g., the application server (AS) or content provider (CP)) providing MBS and process data traffic based on control of the MBSF 108*b*, and may act as a media anchor for MBS data traffic in the 5GS, for example.

In an embodiment, an MBS system that does not include the MBSF 108*b* and the MBSTF 108*a* may be configured in the 5G core network (5GC). When the MBSF 108*b* and the MBSTF 108*a* are not included, the AF 110 may request the MB-SMF 114 to provide an MBS service, directly or through the NEF 128. The MBS data may be provided to the 5G network (e.g., UPF 118 and NG-RAN 104) through the MB-UPF 106 from the AF 110 (e.g., the application server (AS) or content provider (CP)) providing MBS.

In an embodiment, the AF 110 may be an application server (AS) for providing a specific multicast/broadcast application service. In an embodiment, the AS may be understood as being the same as the AF 110 or being co-located along with the AF 130. The AF 110 may send a request to the MBSF 108*b* to provide an MBS service to the UE 102. In response to the request, the MBSF 108*b* may control the MBSTF 108*a*, which is a media anchor in 5GS that transmits MBS data traffic to the UE 102, so that MBS traffic related to the MBS service is transferred to the UE 102. The MBS service may refer to data and/or MBS data packets according to the multicast/broadcast service received from the AF (e.g., the content provider (CP)).

In an embodiment, the MBSF 108*b* and the MBSTF 108*a* may be configured to be integrated (or co-located) into one entity or one NF. In an embodiment, the MBSF 108*b* may be configured to be integrated (or co-located) into the NEF 128 or another NF (e.g., the AF 110). In an embodiment, the AF 110 may directly transmit an MBS service request for the UE 102 to the MB-SMF 114 without the MBSF 108*b* and the MBSTF 108*a*. The MB-UPF 106 may receive media (or media data) related to the MBS service request from the AF 110 (e.g., the application server (AS) or content provider (CP)) and forward data traffic through the UPF 118 to the NG-RAN 104.

In an embodiment, the MBS session may be managed and data traffic may be generated through the MBSF 108*b* and the MBSTF 108*a*. When the data traffic is transferred to the UE 102 through multicast/broadcast, an MBS session (e.g., a multicast MBS session or a broadcast MBS session) may be allocated to manage the data traffic. The MBSF 108*b* may operate as a control plane for managing the MBS session, and the MBSTF 108*a* may operate as a user plane for handling traffic.

In some embodiments, the "multimedia broadcast-multicast service gateway-control plane (MBMS-GW-C) service" may include a control function or service for creating an MBS context for the MBS session, managing the MBS session, and transferring traffic of the MBS session (e.g., MBS traffic) to the NG-RAN 104, which is the base station, through IP multicast.

In an embodiment, the MBMS-GW-C service may be provided by the MB-SMF 114 that manages unicast PDU sessions and has an MBS session control function, or other NFs (e.g., SMF 116 or a new NF). The MB-SMF 114 may support the MBMS-GW-C service and may have the functions of an existing SMF (e.g., the SMF 116).

In some embodiments, the service of transferring, via IP multicast, the MBS traffic received from the MB-UPF 106 according to the MBS context (or MBS session context) for the MBS session to the NG-RAN 20 performing multicast/broadcast according to the MBMS-GW-C service is referred to as a multimedia broadcast-multicast service gateway-user plane (MBMS-GW-U) service.

In an embodiment, the MBMS-GW-U service may be provided by the MB-UPF 106, which has the capability to handle unicast PDU sessions and transfer MBS traffic to the appropriate NG-RAN 20 via IP multicast, or may be provided by another NF (e.g., the UPF 118 or a new NF). The MB-UPF 106 may support the MBMS-GW-U service and may have the functions of an existing UPF (e.g., the UPF 118).

The MBMS-GW-C service may use the N4mb interface as described above to control the MBMS-GW-U service.

In an embodiment, MBMS-GW-C and MBMS-GW-U may be provided by the SMF 116 and UPF 118 or MB-SMF 114 and MB-UPF 106, respectively, but if necessary, the MBS traffic transfer scheme may be referred to as at least one of unicast, multicast, or broadcast.

In an embodiment, MBS traffic may be transferred from the MBMS-GW-U (e.g., by the UPF 118 or MB-UPF 106) to at least one NG-RAN (e.g., the NG-RAN 104). For example, MBS traffic may be transferred to the NG-RAN 20 through IP multicast. In an embodiment, a tunnel (e.g., a shared delivery tunnel or a shared N3 tunnel) between the UPF 118 or MB-UPF 106 and the NG-RAN 104 may be activated.

In an embodiment, to establish the M1 tunnel, the MBMS-GW-C (e.g., SMF 116 or MB-SMF 114) may send control messages to the NG-RAN 104 through the AMF 112.

Figure 2:
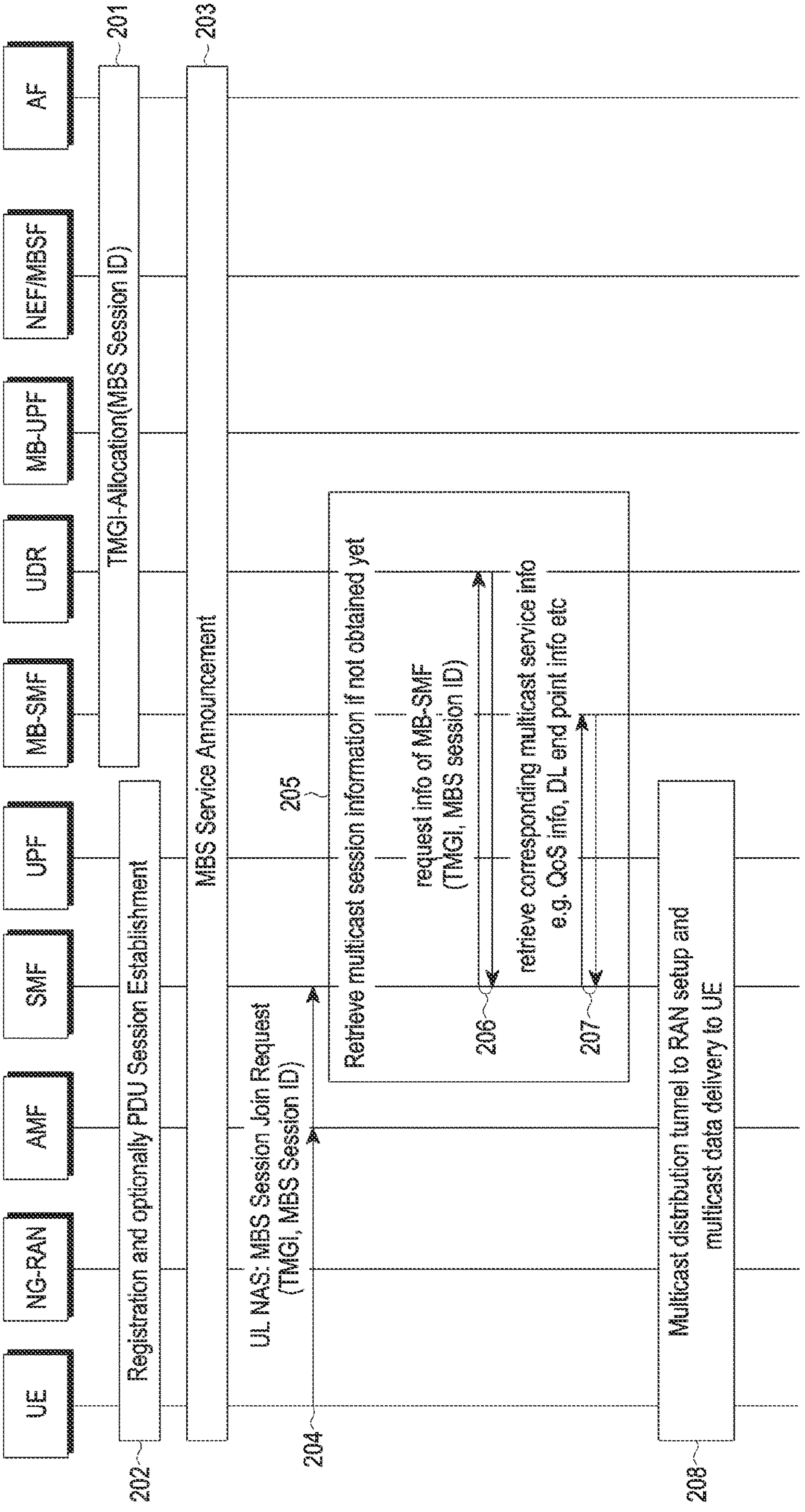
FIG. 2 is a view illustrating an example of a procedure for a UE to join a multicast service to start an MBS service according to an embodiment.

FIG. 2 is a view illustrating an example of a procedure for a UE to join a multicast service to start an MBS service according to an embodiment.

Referring to FIG. 2, in operation 201, an AF (e.g., the AF 110) may request a multicast service (e.g., MBS service) via an NEF (e.g., NEF 128) or MBSF (e.g., MBSF 108*b*) (hereinafter referred to as NEF/MBSF) for a multicast service, and multicast session creation (e.g., MBS session creation) for a multicast service in a cellular network (e.g., 5G core system) may be performed. In operation 201, the NEF/MBSF may request to create a multicast session (e.g., an MBS session) for transmission of MBS data for the multicast service using the MB-SMF discovered and selected for the multicast service. The MB-SMF may create the multicast session (e.g., MBS session) and allocate a multicast session ID (e.g., MBS session ID) and TMGI associated with the multicast session (e.g., MBS session).

In operation 203, the AF or NEF/MBSF performs an MBS service announcement to the UE (e.g., the UE 102) to thereby inform the UE of information (which may include at least one of, e.g., MBS session ID (or multicast session ID), a temporary mobile group identity (TMGI), a source-specific multicast address, or other information) about the multicast service (or a multicast session or MBS session related to the multicast service).

In operation 202, the UE may access the NG-RAN (e.g., the NG-RAN 104) and perform a registration procedure and, if necessary, a PDU session establishment procedure. In operation 203, the UE may be informed of the progress of the multicast service through the MBS service announcement. In operation 204, the UE may transmit an MBS session (or multicast session) join request message to the relevant network entity(s) (e.g., to the SMF via the AMF) including the multicast service-related information (e.g., at least one of the multicast session ID (e.g., MBS session ID), multicast group ID, or TMGI) in order to join the multicast service. In an embodiment, the MBS session (or multicast session) join request message may be delivered from the AMF to the SMF via a PDU session establishment request message or a PDU session modification request message or a separate SM session management non-access stratum (SM NAS) message.

The SMF receiving the MBS session (or multicast session) join request message may proceed to operation 208 if it has information (e.g., MBS session context) about the multicast session related to the multicast service (e.g., identified by the multicast session ID) and determines that multicast transmission to the UE is possible. In operation 208, the SMF may access the UPF and request to create a tunnel (e.g., a multicast distribution tunnel) for transporting multicast service traffic (e.g., data traffic or MBS traffic) of the MBS session to the NG-RAN. The NG-RAN may receive the multicast service traffic (e.g., multicast PDUs) related to the multicast service via the tunnel, and forward the multicast data traffic to the UE via a point-to-point (PTP) or point-to-multipoint (PTM) bearer.

In an embodiment, if the SMF which receives the MBS session (or multicast session) join request message of operation 204 does not have information (e.g., MBS session context) about the multicast session related to the multicast service (e.g., identified by the multicast session ID), the SMF may perform operation 205 to obtain information about the multicast session. Operation 205 may include operation 206 and operation 207. In operation 206, the SMF may send a request, including information identifying the multicast session (e.g., at least one of the TMGI, the multicast session ID (e.g., the MBS session ID), or the multicast group ID), to the user data repository (UDR) to discover the MB-SMF servicing the multicast session, and receive a response including an MB-SMF ID identifying the MB-SMF servicing the multicast session from the UDR. In operation 207, the SMF may request the MB-SMF corresponding to the obtained MB-SMF ID, receiving information about the multicast service and multicast session (e.g., quality of service (QoS) information and endpoint information of the DL tunnel). The SMF may then proceed to operation 208.

In operation 208, the SMF may access the UPF and request to create a tunnel to transmit multicast service traffic (e.g., MBS traffic) to the NG-RAN. The NG-RAN may receive the multicast service traffic related to the multicast service via the tunnel, and forward the multicast service traffic to the UE via a PTP or PTM bearer.

While operation 205 depicts that the SMF obtains information about the appropriate MB-SMF from the UDR, the SMF may obtain information about the appropriate MB-SMF in other ways due to security concerns in embodiments described below.

Figure 3:
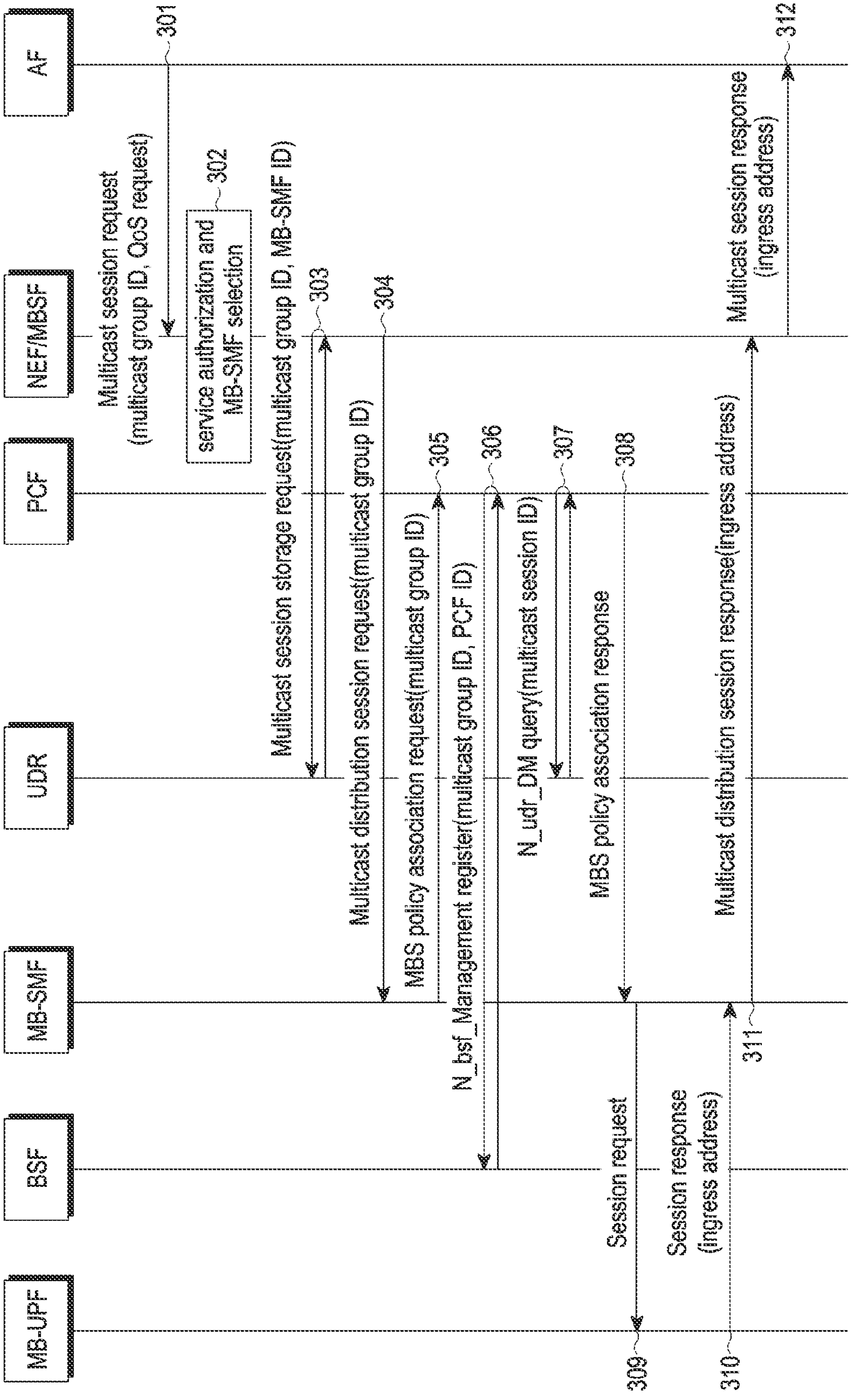
FIG. 3 is a view illustrating an example of a multicast session create procedure to start an MBS service according to an embodiment.

FIG. 3 is a view illustrating an example of a procedure for a multicast session configuration according to an embodiment. The operations shown in an embodiment may correspond to operation 201 of FIG. 2. Operations for configuring a multicast service in a cellular network to start an MBS service are described. In various embodiments, at least some of the operations to be described below may be omitted, modified, or reordered.

Referring to FIG. 3, in operation 301, the AF (e.g., the AF 110) may transmit a request message requesting a multicast session for the multicast service to the NEF or MBSF (hereinafter referred to as NEF/MBSF) for the multicast service. The request message may include information about the multicast service (e.g., at least one of the multicast group ID identifying the multicast group using the multicast service, the multicast session ID (e.g., MBS session ID), or TMGI) and, if necessary, may further include QoS requests for the multicast service.

In operation 302, the NEF/MBSF receiving the request message may proceed with service authorization through an authorization check on whether to service the multicast session and, if the multicast session is allowed, select the MB-SMF to manage the multicast session. In operation 303, the NEF/MBSF may transmit information related to the selected MB-SMF (e.g., at least one of the MB-SMF ID or the multicast group ID) to the UDR to be stored. In an embodiment, the information stored in the UDR may include at least one of the MB-SMF ID or the address of the MB-SMF, corresponding to at least one of the multicast group ID indicating the multicast group using the multicast service, multicast session ID (e.g., MBS session ID), or TMGI In operation 304, the NEF/MBSF may send a session create request message (e.g., multicast distribution session request message or MBSSession_Create Request message) to the selected MB-SMF to request a transmission session (e.g., multicast session or MBS session) related to the multicast service. In an embodiment, the request message may include at least one of the multicast group ID, the multicast session ID (e.g., MBS session ID) or TMGI.

In operation 305, the MB-SMF may send an MBS policy association request message to the PCF (e.g., PCF 126) servicing the multicast group ID (or multicast session ID (e.g., MBS session ID) or TMGI) in response to the request message. In operation 306, the PCF may register binding information with the BSF for MBS session binding. In an embodiment, the binding information may include the PCF ID for identifying the PCF and the multicast group ID (or the multicast session ID (e.g., MBS session ID) or TMGI). If necessary, in operation 307, the PCF may obtain information about at least one of the multicast group ID, multicast session ID (e.g., MBS session ID) or TMGI from the UDR through a data management (DM) query. In operation 308, the PCF may determine a policy for the multicast session identified by at least one of the multicast group ID, multicast session ID (e.g., MBS session ID), or TMGI, and transfer information about the determined policy to the MB-SMF through an MBS policy association response message.

In operation 309 and operation 310, the MB-SMF may request, via signaling (e.g., session request messages and session response messages) with the MB-UPF, to establish a tunnel to be used for transferring MBS traffic for the multicast session (e.g., MBS session).

In an embodiment, for scenarios where the MBSF is not used, the ingress address (e.g., IP address and port number) may be transferred to the MB-SMF through the session response message of operation 310. In an embodiment, the MB-SMF may directly transfer the information about the ingress address to the AF. In an embodiment, in operation 311, the MB-SMF may transmit the information about the ingress address obtained through the session response message to the NEF/MBSF through a response message (e.g., a multicast distribution session response message or an MBSSession_Create Response message) to the session creation request of operation 304 and, in operation 312, the information about the ingress address may be transferred from the NEF/MBSF to the AF through a multicast session response message.

In an embodiment, for scenarios where the MBSF is used, the tunnel endpoint may be transferred to the MB-SMF through a session response message in operation 310. In operation 311, the MB-SMF may transfer information about the tunnel endpoint to the MBSF and, in operation 312, the MBSF may transfer the information about the ingress address assigned by the MBSF (or MBSTF) to the AF. The AF may transmit multicast service data using the transferred ingress address.

Figure 4:
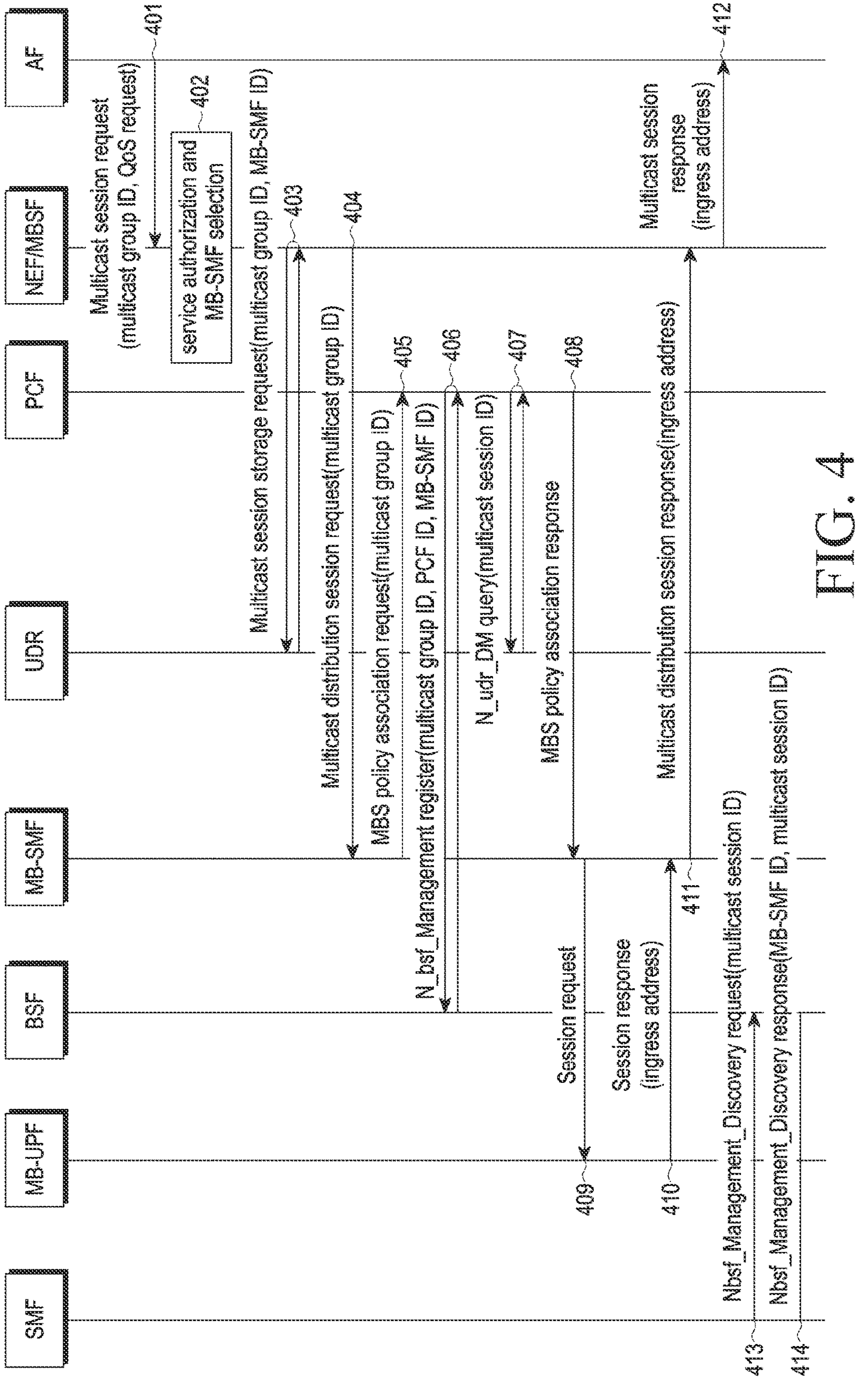
FIG. 4 is a view illustrating an example of a procedure to discover an MB-SMF supporting a multicast service joined by a UE according to an embodiment.

FIG. 4 is a view illustrating an example of a procedure to discover an MB-SMF supporting a multicast service joined by a UE according to an embodiment. In various embodiments, at least some of the operations to be described below may be omitted, modified, or reordered.

Referring to FIG. 4, in operation 401, the AF (e.g., the AF 110) may transmit a request message requesting a multicast session (e.g., MBS session) for the multicast service to the NEF or MBSF (hereinafter referred to as NEF/MBSF) for the multicast service. The request message may include information about the multicast service (e.g., at least one of the multicast group ID identifying the multicast group using the multicast service, the multicast session ID (e.g., MBS session ID), or TMGI) and, if necessary, may further include QoS requests for the multicast service.

In operation 402, the NEF/MBSF receiving the request message may proceed with service authorization through an authorization check on whether to service the multicast session and, if the multicast session is allowed, select the MB-SMF to manage the multicast session. In operation 403, the NEF/MBSF may transmit information related to the selected MB-SMF (e.g., MB-SMF ID) and information related to the multicast session (e.g., at least one of the multicast group ID, the multicast session ID (e.g., the MBS session ID), or the TMGI) to the UDR to be stored. In an embodiment, the information stored in the UDR may include at least one of the MB-SMF ID or the address of the MB-SMF, corresponding to at least one of the multicast group ID indicating the multicast group using the multicast service, multicast session ID (e.g., MBS session ID), or TMGI In operation 404, the NEF/MBSF may send a session create request message (e.g., multicast session multicast distribution session message or MBSSession_Create Request message) to the selected MB-SMF to request a transmission session (e.g., multicast session or MBS session) for data transmission related to the multicast service. In an embodiment, the request message may include at least one of the multicast group ID, the multicast session ID (e.g., MBS session ID) or TMGI.

In operation 405, the MB-SMF may send an MBS policy association request message to the PCF (e.g., PCF 126) servicing the multicast group ID (or multicast session ID or TMGI) in response to the request message. In operation 406, the PCF may register binding information with the BSF for MBS session binding. In an embodiment, the binding information may include the PCF ID for identifying the PCF and the multicast group ID (or the multicast session ID (e.g., MBS session ID) or TMGI). In an embodiment, the binding information may further include an MB-SMF ID (or MB-SMF address). If necessary, in operation 407, the PCF may obtain information about the multicast group ID, multicast session ID (e.g., MBS session ID) or TMGI from the UDR through a DM query.

In operation 408, the PCF may determine a policy for the multicast session identified by the obtained at least one of the multicast group ID, multicast session ID (e.g., MBS session ID), or TMGI, and transfer information about the determined policy to the MB-SMF through an MBS policy association response message.

In operation 409 and operation 410, the MB-SMF may request, via signaling (e.g., session request messages and session response messages) with the MB-UPF, to establish a tunnel to be used for transferring MBS traffic for the multicast session (e.g., MBS session). In an embodiment, in operation 411, the MB-SMF may transmit the information about the ingress address obtained through the session response message of operation 410 to the NEF/MBSF through a response message (e.g., a multicast distribution session response message or an MBSSession_Create Response message) to the session creation request of operation 404 and, in operation 412, the information about the ingress address may be transferred from the NEF/MBSF to the AF through a multicast session response message. In an embodiment, the MB-SMF may directly transfer the information about the ingress address to the AF.

In an embodiment, the MBS session join request message from the UE (e.g., the UE 102) may be received by the SMF as in operation 204 of FIG. 2. In an embodiment, operation 205 for discovering the MB-SMF servicing the multicast session (e.g., MBS session) requested by the MBS session join request message (e.g., identified by the MBMS session ID included in the MBS session join request message) by the SMF may include operation 413 and operation 414 instead of operation 206.

In an embodiment, in operation 413, the SMF may transmit a discovery request message (e.g., Nbsf_Management_Discovery request message) to the BSF. The discovery request message may include information about at least one of the multicast group ID, the multicast session ID (e.g., the MBS session ID), or the TMGI related to the multicast session to be requested. In operation 414, in response to the discovery request message, the BSF may send, to the SMF, a discovery response message (e.g., an Nbsf_Management_Discovery response message) including information (e.g., MB-SMF ID) about the MB-SMF that maps to at least one of the multicast group ID, MBS session ID, or TMGI registered in operation 406. In an embodiment, the SMF may perform operations 207 and 208 based on the MB-SMF ID.

Figure 5:
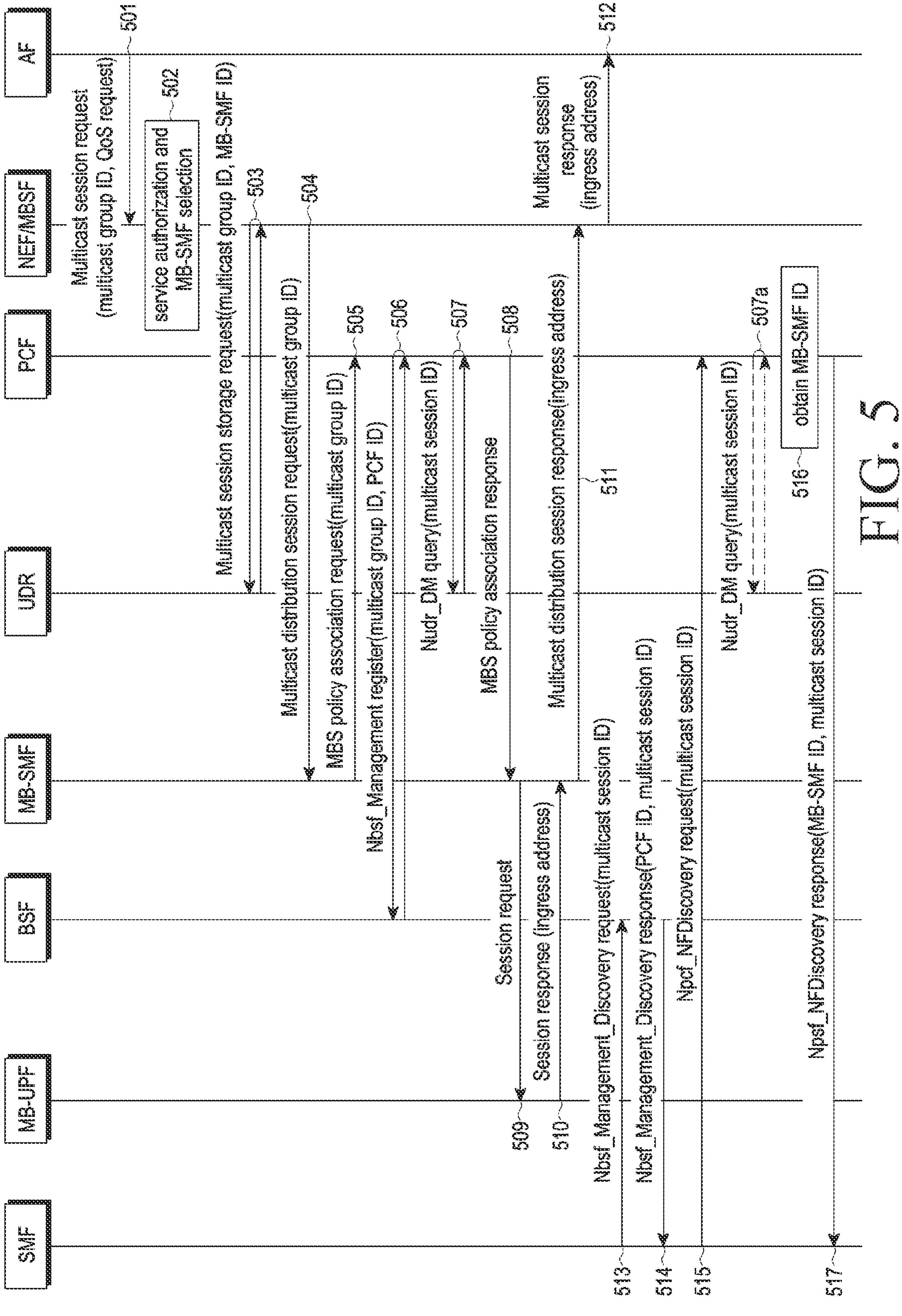
FIG. 5 is a view illustrating an example of a procedure to discover an MB-SMF supporting a multicast service joined by a UE through a BSF according to an embodiment.

FIG. 5 is a view illustrating an example of a procedure to discover an MB-SMF supporting a multicast service joined by a UE through a BSF according to an embodiment. In various embodiments, at least some of the operations to be described below may be omitted, modified, or reordered.

Referring to FIG. 5, in operation 501, the AF (e.g., the AF 110) may transmit a request message requesting a multicast session (e.g., MBS session) for the multicast service to the NEF or MBSF (hereinafter referred to as NEF/MBSF) for the multicast service. The request message may include information about the multicast service (e.g., at least one of the multicast group ID identifying the multicast group using the multicast service, the multicast session ID (e.g., MBS session ID), or TMGI) and, if necessary, may further include QoS requests for the multicast service.

In operation 502, the NEF/MBSF receiving the request message may proceed with service authorization through an authorization check on whether to service the multicast session and, if the multicast session is allowed, select the MB-SMF to manage the multicast session. In operation 503, the NEF/MBSF may transmit information related to the selected MB-SMF (e.g., MB-SMF ID) and information related to the multicast session (e.g., at least one of the multicast group ID, the multicast session ID (e.g., the MBS session ID), or the TMGI) to the UDR to be stored. In an embodiment, the information stored in the UDR may include at least one of the MB-SMF ID or the MB-SMF address corresponding to at least one of the multicast group ID indicating the multicast group using the multicast service, multicast session ID (e.g., MBS session ID), or TMGI.

In operation 504, the NEF/MBSF may send a session create request message (e.g., multicast distribution session message or MBSSession_Create Request message) to the selected MB-SMF to request a transmission session (e.g., multicast session or MBS session) for data transmission related to the multicast service. In an embodiment, the request message may include at least one of the multicast group ID, the multicast session ID (e.g., MBS session ID) or TMGI.

In operation 505, the MB-SMF may send an MBS policy association request message to the PCF (e.g., PCF 126) servicing the multicast group ID (or multicast session ID or TMGI) in response to the request message. In operation 506, the PCF may register binding information with the BSF for MBS session binding. In an embodiment, the binding information may include the PCF ID for identifying the PCF and the multicast group ID (or the multicast session ID (e.g., MBS session ID) or TMGI). If necessary, in operation 507, the PCF may obtain information about the multicast group ID, multicast session ID (e.g., MBS session ID) or TMGI from the UDR through a DM query. The information obtained from the UDR may include information (e.g., MB-SMF ID or MB-SMF address) about the MB-SMF mapped to at least one of the multicast group ID, multicast session ID (e.g., MBS session ID), or TMGI.

In operation 508, the PCF may determine a policy for the multicast session identified by the at least one of the multicast group ID, multicast session ID (e.g., MBS session ID), or TMGI obtained from the UDR, and transfer information about the determined policy to the MB-SMF through an MBS policy association response message.

In operation 509 and operation 510, the MB-SMF may request, via signaling (e.g., session request messages and session response messages) with the MB-UPF, to establish a tunnel to be used for transferring MBS traffic for the multicast session (e.g., MBS session). In operation 511, the MB-SMF may transmit the information about the ingress address obtained through the session response message of operation 510 to the NEF/MBSF through a response message (e.g., a multicast distribution session response message or an MBSSession_Create Response message) to the session creation request of operation 504 and, in operation 512, the information about the ingress address may be transferred from the NEF/MBSF to the AF through a multicast session response message. In an embodiment, the MB-SMF may directly transfer the information about the ingress address to the AF.

In an embodiment, the MBS session join request message from the UE (e.g., the UE 102) may be received by the SMF as in operation 204 of FIG. 2. In an embodiment, operation 205 for discovering the MB-SMF servicing the multicast session (e.g., MBS session) requested by the MBS session join request message (e.g., identified by the MBMS session ID included in the MBS session join request message) by the SMF may include operation 513 to operation 517 (and operation 507*a*) instead of operation 206.

In an embodiment, in operation 513, the SMF may transmit a discovery request message (e.g., Nbsf_Management_Discovery request message) to the BSF. The discovery request message may include information about at least one of the multicast group ID, the multicast session ID (e.g., the MBS session ID), or the TMGI related to the multicast session to be requested. In operation 514, in response to the discovery request message, the BSF may send, to the SMF, a discovery response message (e.g., an Nbsf_Management_Discovery response message) including PCF information (e.g., PCF ID) mapped to at least one of the multicast group ID, MBS session ID, or TMGI registered in operation 506.

In operation 515, the SMF may send a discovery request message (e.g., an Npcf_NFDiscovery request message) to the PCF identified by the PCF ID. The discovery request message may include information about at least one of the multicast group ID, the multicast session ID (e.g., the MBS session ID), or the TMGI related to the multicast session to be requested.

In an embodiment, if the PCF does not have information about at least one of the multicast group ID, the multicast session ID (e.g., MBS session ID), or TMGI included in the discovery request message, in operation 507*a*, the PCF may transmit a message (e.g., Nudr_DM query) for DM query to the UDR, and obtain, from the UDR, information (e.g., MB-SMF ID or MB-SMF address) about the MB-SMF servicing at least one of the multicast group ID, multicast session ID (e.g., MBS session ID), or TMGI. If the PCF has the information about at least one of the multicast group ID, multicast session ID (e.g., MBS session ID), or TMGI included in the discovery request message, operation 507*a* may be omitted. In operation 517, the PCF may send a discovery response message (e.g., an Npcf_NFDiscovery response message) including the obtained MB-SMF information (e.g., MB-SMF ID or MB-SMF address) to the SMF. In an embodiment, the SMF may perform operations 207 and 208 based on the MB-SMF ID.

Figure 6:
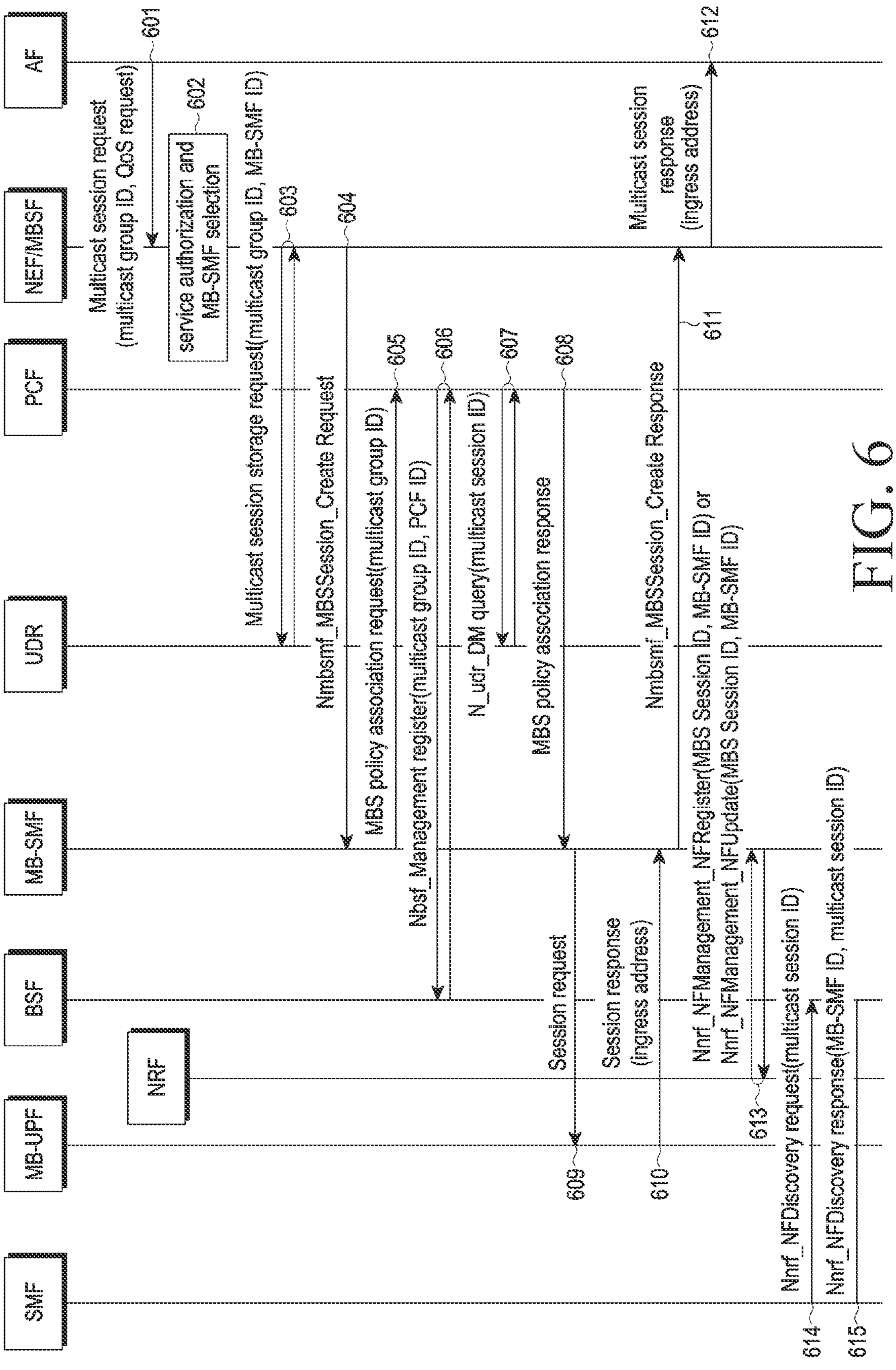
FIG. 6 is a view illustrating an example of a procedure to discover an MB-SMF supporting a multicast service joined by a UE through a NRF according to an embodiment.

FIG. 6 is a view illustrating an example of a procedure to discover an MB-SMF supporting a multicast service joined by a UE through a NRF according to an embodiment. In various embodiments, at least some of the operations to be described below may be omitted, modified, or reordered.

Referring to FIG. 6, in operation 601, the AF (e.g., the AF 110) may transmit a request message requesting a multicast session (e.g., MBS session) for the multicast service to the NEF or MBSF (hereinafter referred to as NEF/MBSF) for the multicast service. The request message may include information about the multicast service (e.g., at least one of the multicast group ID identifying the multicast group using the multicast service, the multicast session ID (e.g., MBS session ID), or TMGI) and, if necessary, may further include QoS requests for the multicast service.

In operation 602, the NEF/MBSF receiving the request message may proceed with service authorization through an authorization check on whether to service the multicast session and, if the multicast session is allowed, select the MB-SMF (e.g., the MB-SMF 114) to manage the multicast session. In operation 603, the NEF/MBSF may transmit information related to the selected MB-SMF (e.g., MB-SMF ID) and information related to the multicast session (e.g., at least one of the multicast group ID, the multicast session ID (e.g., the MBS session ID), or the TMGI) to the UDR to be stored. In an embodiment, the information stored in the UDR may include at least one of the MB-SMF ID or the address of the MB-SMF, corresponding to at least one of the multicast group ID indicating the multicast group using the multicast service, multicast session ID (e.g., MBS session ID), or TMGI In an embodiment, operation 603 may be omitted.

In operation 604, the NEF/MBSF may send a session create request message (e.g., multicast distribution session message or MBSSession_Create Request message) to the selected MB-SMF to request a transmission session (e.g., multicast session or MBS session) for data transmission related to the multicast service. In an embodiment, the request message may include at least one of the multicast group ID, the multicast session ID (e.g., MBS session ID) or TMGI.

In operation 605, the MB-SMF may send an MBS policy association request message to the PCF (e.g., PCF 126) servicing the multicast service corresponding to the multicast group ID (or multicast session ID (e.g., MBS session ID) or TMGI) in response to the request message. In operation 606, the PCF may register binding information with the BSF for MBS session binding. In an embodiment, the binding information may include the PCF ID for identifying the PCF and the multicast group ID (or the multicast session ID (e.g., MBS session ID) or TMGI). If necessary, in operation 607, the PCF may obtain information about the multicast group ID, multicast session ID (e.g., MBS session ID) or TMGI from the UDR through a DM query.

In operation 608, the PCF may determine a policy for the multicast session identified by the at least one of the multicast group ID, multicast session ID (e.g., MBS session ID), or TMGI obtained from the UDR, and transfer information about the determined policy to the MB-SMF through an MBS policy association response message.

In operation 609 and operation 610, the MB-SMF may request, via signaling (e.g., N4mb session request messages and N4mb session response messages) with the MB-UPF (e.g., the MB-UPF 106), to establish a tunnel to be used for transferring MBS traffic for the multicast session (e.g., MBS session). In operation 611, the MB-SMF may transmit the information about the ingress address obtained through the N4mb session response message to the NEF/MBSF through a response message (e.g., a multicast distribution session response message or an MBSSession_Create Response message) to the session creation request of operation 604 and, in operation 612, the information about the ingress address may be transferred from the NEF/MBSF to the AF through an MBS session creation response message. In an embodiment, the MB-SMF may directly transfer the information about the ingress address to the AF.

In an embodiment, the MB-SMF may perform operation 613 if it is determined to service the MBS session (e.g., after receiving the message of operation 608 or after completing operation 610). In operation 613, the MB-SMF may register, with the NRF (e.g., NRF 124), information identifying the MB-SMF (e.g., MB-SMF ID or address of the MB-SMF) for at least one of the multicast group ID, multicast session ID (e.g., MBS session ID), or TMGI.

In an embodiment, the Nnrf_NFManagement_NFRegister message or the Nnrf_NFManagement_NFUpdate message may be used to register for the NRF. In an embodiment, the Nnrf_NFManagement_NFRegister message may be used to register the MB-SMF's NF profile with the NRF for the first time. The NF profile may include information identifying the MB-SMF (e.g., an MB-SMF ID or MB-SMF address) for information (e.g., at least one of the multicast group ID, multicast session ID (e.g., MBS session ID), or TMGI) related to a specific multicast session. In an embodiment, the Nnrf_NFmanagement_NFUpdate message may be used to transfer the updated NF profile of the MB-SMF to the NRF.

In an embodiment, the information stored in the NRF may further include the expiration time of providing the service for the multicast group ID, multicast session ID (e.g., MBS session ID), or TMGI. The NRF may continuously identify the expiration time and may prevent incorrect information from being provided to the SMF by deleting the related information after the expiration time.

In an embodiment, the MBS session join request message from the UE (e.g., the UE 102) may be received by the SMF (e.g., the SMF 116) as in operation 204 of FIG. 2. In an embodiment, operation 205 for discovering the MB-SMF servicing the multicast session (e.g., MBS session) requested by the MBS session join request message, e.g., identified by the MBS session ID included in the MBS session join request message, by the SMF may include operation 614 and operation 615 instead of operation 206.

In an embodiment, in operation 614, the SMF may transmit a discovery request message (e.g., Nnrf_NFDiscovery request message) to the NRF. The discovery request message may include information about at least one of the multicast group ID, the multicast session ID (e.g., the MBS session ID), or the TMGI related to the multicast session to be requested. In operation 615, in response to the discovery request message, the NRF may send, to the SMF, a discovery response message (e.g., an Nnrf_NFDiscovery response message) including information (e.g., SMF ID) about the MB-SMF that maps to at least one of the multicast group ID, MBS session ID, or TMGI registered in operation 613. In an embodiment, the SMF may perform operations 207 and 208 based on the obtained MB-SMF ID.

In an embodiment, the BSF or another NF may operate instead of the NRF in operations 613, 614, and 615.

Figure 7:
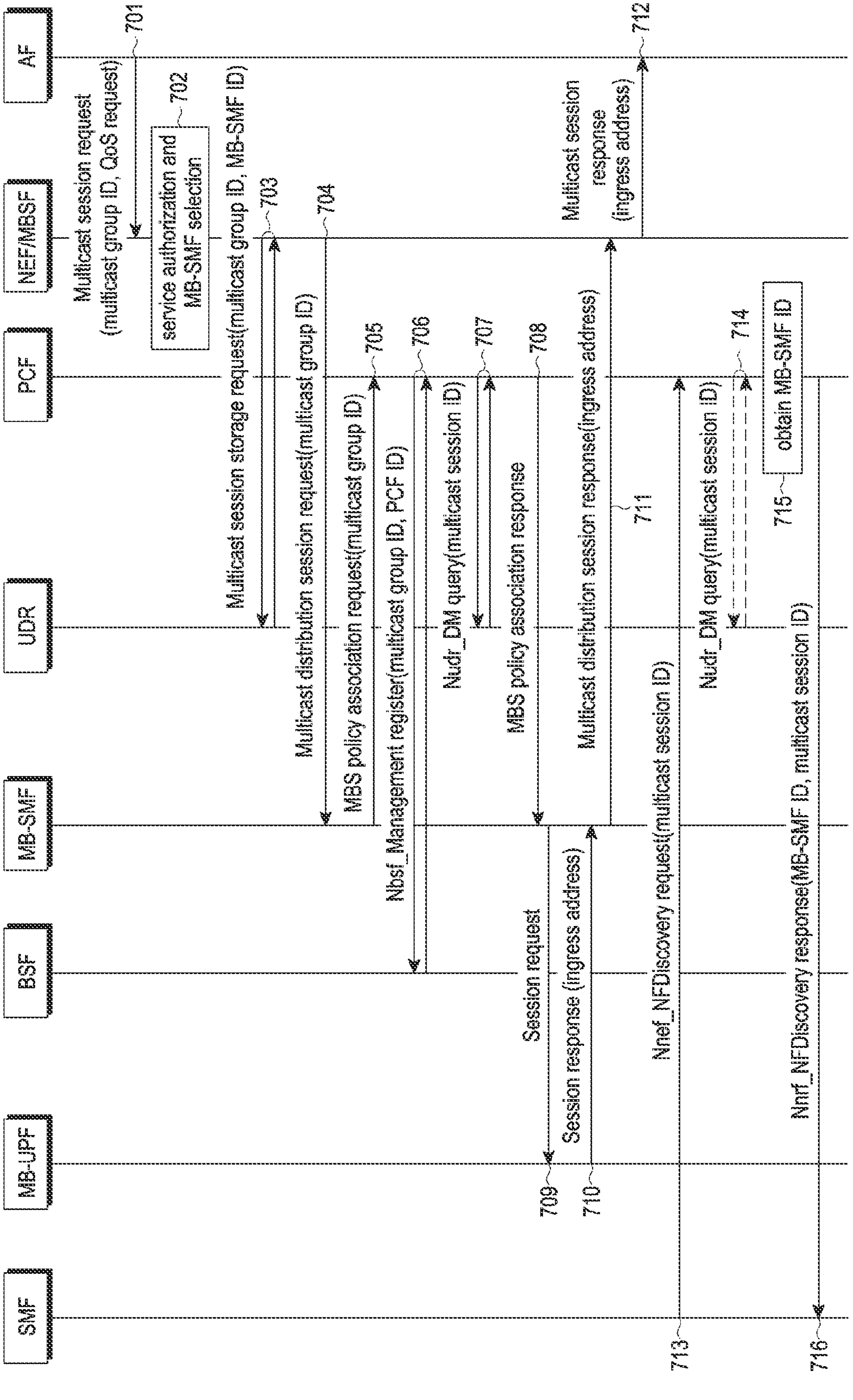
FIG. 7 is a view illustrating an example of a procedure to discover an MB-SMF supporting a multicast service joined by a UE through a NEF or MBSF according to an embodiment.

FIG. 7 is a view illustrating an example of a procedure to discover an MB-SMF supporting a multicast service joined by a UE through a NEF or MBSF according to an embodiment. In various embodiments, at least some of the operations to be described below may be omitted, modified, or reordered.

Referring to FIG. 7, in operation 701, the AF (e.g., the AF 110) may transmit a request message requesting a multicast session (e.g., MBS session) for the multicast service to the NEF or MBSF (hereinafter referred to as NEF/MBSF) for the multicast service. The request message may include information about the multicast service (e.g., at least one of the multicast group ID identifying the multicast group using the multicast service, the multicast session ID (e.g., MBS session ID), or TMGI) and, if necessary, may further include QoS requests for the multicast service.

In operation 702, the NEF/MBSF receiving the request message may proceed with service authorization through an authorization check on whether to service the multicast session and, if the multicast session is allowed, select the MB-SMF to manage the multicast session. In operation 703, the NEF/MBSF may transmit information related to the selected MB-SMF (e.g., MB-SMF ID) and information related to the multicast session (e.g., at least one of the multicast group ID, the multicast session ID (e.g., the MBS session ID), or the TMGI) to the UDR to be stored. In an embodiment, the information stored in the UDR may include at least one of the MB-SMF ID or MB-SMF address corresponding to at least one of the multicast group ID indicating the multicast group using the multicast service, multicast session ID (e.g., MBS session ID), or TMGI.

In operation 704, the NEF/MBSF may send a session create request message (e.g., multicast distribution session message or MBSSession_Create Request message) to the selected MB-SMF to request a transmission session (e.g., multicast session or MBS session) for data transmission related to the multicast service. In an embodiment, the multicast distribution session request message may include at least one of the multicast group ID, the multicast session ID (e.g., MBS session ID) or TMGI.

In operation 705, the MB-SMF may send an MBS policy association request message to the PCF (e.g., PCF 126) servicing the multicast group ID (or multicast session ID or TMGI) in response to the multicast distribution session request message. In operation 706, the PCF may register binding information with the BSF for MBS session binding. In an embodiment, the binding information may include the PCF ID for identifying the PCF and the multicast group ID (or the multicast session ID (e.g., MBS session ID) or TMGI). If necessary, in operation 707, the PCF may obtain information about the multicast group ID, multicast session (e.g., MBS session ID) or TMGI from the UDR through a DM query.

In operation 708, the PCF may determine a policy for the multicast session identified by the at least one of the multicast group ID, multicast session ID (e.g., MBS session ID), or TMGI obtained from the UDR, and transfer information about the determined policy to the MB-SMF through an MBS policy association response message.

In operation 709 and operation 710, the MB-SMF may request, via signaling (e.g., session request messages and session response messages) with the MB-UPF, to establish a tunnel to be used for transferring MBS traffic for the multicast session (e.g., MBS session). In operation 711, the MB-SMF may transmit the information about the ingress address obtained through the session response message of operation 710 to the NEF/MBSF through a response message (e.g., a multicast distribution session response message or an MBSSession_Create Response message) to the session creation request of operation 704 and, in operation 712, the information about the ingress address may be transferred from the NEF/MBSF to the AF through a multicast session response message.

In an embodiment, the MBS session join request message from the UE (e.g., the UE 102) may be received by the SMF as in operation 204 of FIG. 2. In an embodiment, operation 205 for discovering the MB-SMF servicing the multicast session (e.g., MBS session) requested by the MBS session join request message (e.g., identified by the MBMS session ID included in the MBS session join request message) by the SMF may include operation 713 to operation 716 instead of operation 206.

In an embodiment, in operation 713, the SMF may transmit a discovery request message (e.g., Nnef_NFDiscovery request message) to the NEF. The discovery request message may include information about at least one of the multicast group ID, the multicast session ID (e.g., the MBS session ID), or the TMGI related to the multicast session to be requested. In operation 715, the NEF receiving the discovery request message may obtain, e.g., information (e.g., MB-SMF ID) about the MB-SMF mapped to the information stored in operation 702, e.g., at least one of the multicast group ID, multicast session ID (e.g., MBS session ID), or TMGI.

In an embodiment, if the NEF does not have the MB-SMF ID corresponding to the multicast session, operation 714 may be performed. In operation 714, the NEF may send a DM query message (e.g., Nudr_DM query) to the UDR to obtain information (e.g., MB-SMF ID or MB-SMF address) about the MB-SMF servicing the multicast session corresponding to at least one of the multicast group ID, multicast session ID (e.g., MBS session ID), or TMGI.

In operation 716, the NEF may include the obtained MB-SMF information (e.g., MB-SMF ID or MB-SMF address) in the discovery response message (e.g., Nnrf_NF-Discovery response message) and transmit it to the SMF. The discovery response message may include at least one of the multicast group ID, multicast session ID (e.g., MBS session ID), or TMGI received through the discovery request message and the MB-SMF information (e.g., MB-SMF ID or MB-SMF address). In an embodiment, the SMF may perform operations 207 and 208 based on the obtained MB-SMF 1D.

In an embodiment, the MBSF or another NF may operate instead of the NEF in operations 702, 713, 714, 715, and 716.

Figure 8:
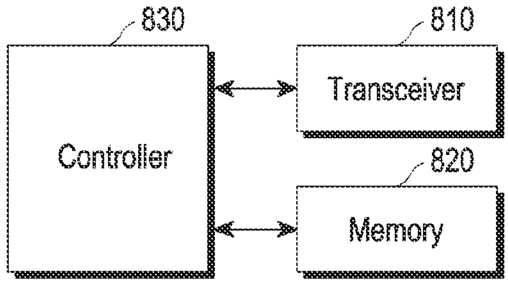
FIG. 8 is a block diagram illustrating a structure of a network entity according to an embodiment.

FIG. 8 is a block diagram illustrating a structure of a network entity according to an embodiment. In an embodiment, at least one of the SMF 116, MB-SMF 114, NRF 124, or other NF described with reference to FIGS. 2 to 7 may be implemented as the network entity of FIG. 8.

Referring to FIG. 8, the network entity (e.g., SMF 116, MB-SMF 114, or NRF 124) may include a transceiver 810, a memory 820, and a controller 830. According to at least one of the above-described communication procedures, the transceiver 810, the controller 830, and the memory 820 may operate. However, the components of the network entity are not limited thereto. For example, the network entity may include more or fewer components than the above-described components. Further, at least one of the transceiver 810, the controller 830, and the memory 920 may be implemented in the form of a single chip. As an example, the controller 830 may include one or more processors.

The transceiver 810 collectively refers to the receiver and transmitter of the network entity and may transmit and receive signals to/from a UE or another network entity. In an embodiment, the transceiver 810 may include an RF transmitter for frequency-up converting and amplifying signals transmitted and an RF receiver for low-noise amplifying signals received and frequency-down converting the frequency of the received signals. In an embodiment, the transceiver 810 may include software and/or hardware components that support the above-described interfaces (e.g., the N4 interface). However, this is merely an example of the transceiver 810, and the components of the transceiver 810 are not limited by the description of the disclosure. The transceiver 810 may output the signals, messages, and/or data received from the UE and/or other network entities to the controller 830, and may forward the signals, messages, and/or data output from the controller 830 to the UE and/or other network entities.

The memory 820 may store programs and data necessary for the operation of the network entity. The memory 820 may store control information or data that is included in the signal obtained by the network entity. The memory 820 may be a storage medium (e.g., read only memory (ROM), random access memory (RAM), hard disk, compact disc read only memory (CD-ROM) or digital video disc (DVD)) or a combination of storage media. Rather than being separately provided, the memory 820 may be embedded in the processor 830.

The controller 830 may include software and/or hardware components for controlling a series of operations so that the network entity may operate according to at least one of the above-described embodiments. For example, the controller 830 may receive signals, messages, and/or data from the UE or other network entities through the transceiver 810, and process the received signals, messages, and/or data. For example, the controller 830 may transmit the processed signals, messages, and/or data to the UE or other network entities through the transceiver 910. There may be provided a plurality of controllers 830. The controller 830 may control the components of the network entity by executing a program stored in the memory 820.

Figure 9:
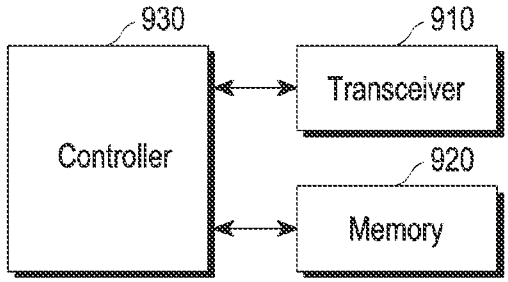
FIG. 9 is a block diagram illustrating a structure of a UE according to an embodiment.

FIG. 9 is a block diagram illustrating a structure of a UE according to an embodiment.

Referring to FIG. 9, the UE (e.g., the UE 102) may include a transceiver 910, a memory 920, and a controller 930. According to at least one of the above-described communication procedures, the transceiver 910, the controller 930, and the memory 920 of the UE may operate. However, the components of the UE are not limited thereto. For example, the UE may include more or fewer components than the above-described components. Further, at least one of the transceiver 910, the controller 930, and the memory 920 may be implemented in the form of a single chip. The controller 930 may include one or more processors.

The transceiver 910 collectively refers to the receiver and transmitter of the UE, and may transmit and receive signals to/from at least one network entity (e.g., the NG-RAN 104). To that end, the transceiver 910 may include an RF transmitter for frequency-up converting and amplifying signals transmitted and an RF receiver for low-noise amplifying signals received and frequency-down converting the frequency of the received signals. However, this is merely an example of the transceiver 910, and the components of the transceiver 910 are not limited by the description of the disclosure.

The memory 920 may store programs and data necessary for the operation of the UE. The memory 920 may store control information or data that is included in the signal obtained by the UE. The memory 1020 may include a storage medium (e.g., ROM, RAM, hard disk, CD-ROM, or DVD) or a combination of storage media. Rather than being separately provided, the memory 920 may be embedded in the processor 930.

The controller 930 may include software and/or hardware components for controlling a series of operations so that the UE may operate according to the above-described embodiments of the disclosure. For example, the controller 930 may receive signals, messages, and/or data through the transceiver 910, and process the received signals, messages, and/or data. For example, the controller 930 may transmit the processed signals, messages, and/or data to the network entity through the transceiver 910. There may be provided a plurality of controllers 930. The controller 930 may control the components of the UE by executing a program stored in the memory 920.

According to an embodiment, a method performed by a session management function (SMF) 116 for a UE 102 to join a multicast service may comprise receiving (204) a join request message for joining the multicast service for the UE, transmitting (614) a discovery request message including a multicast/broadcast service (MBS) session ID related to the multicast service to a network function (NF) repository function (NRF), receiving (615), from the NRF, a discovery response message including a multicast/broadcast (MB)-SMF ID mapped to the MBS session ID in response to the discovery request message, obtaining (207) information about a MBS session indicated by the MBS session ID from an MB-SMF identified by the MB-SMF ID, and notifying (208) a radio access network (RAN) accessed by the UE of information related to the MBS session based on the obtained information.

In an embodiment, the join request message may be received by the SMF from an access and mobility management function (AMF) managing the UE, through a protocol data unit (PDU) session establishment request message, a PDU session modification request message, or a session management non-access stratum (SM NAS) message.

In an embodiment, the method may further comprise identifying whether an MBS session context related to the multicast service is present in the SMF in response to reception of the join request message and determining to transmit the discovery request message when the MBS session context is identified not to be present.

In an embodiment, data traffic of the MBS session may be transferred from the RAN to the UE through a point-to-point (PTP) or point-to-multipoint (PTM) bearer.

In an embodiment, the notifying may include accessing a user plane function (UPF) related to the UE to request to create a tunnel for transmitting data traffic of the MBS session to the RAN.

According to various embodiments, a method performed by a multicast/broadcast session management function (MB-SMF) 114 for a UE 102 to join a multicast service may comprise creating (201) an MBS session having a MBS session ID for providing a multicast service, transmitting (613), to a network function (NF) repository function (NRF), a request message requesting to store an MB-SMF ID identifying the MB-SMF for the MBS session ID, requesting (309 and 310) a multicast/broadcast user plane function (MB-UPF) to set a tunnel to be used to transfer data traffic for the MBS session, and transmitting (311 and 312) an ingress address for the MBS session received from the MB-UPF to an application function (AF) providing the multicast service.

In an embodiment, the method may further comprise receiving (304) a request message to request to create the MBS session from a network exposure function (NEF) or a multicast/broadcast service function (MBSF) and transmitting (311) a response message including the ingress address to the NEF/MBSF.

In an embodiment, the request message may include the MBS session ID.

In an embodiment, the method may further comprise transmitting (305) a policy association request message including the MBS session ID to a policy control function (PCF) and receiving (308), from the PCF, a policy association response message including information about a policy related to the MBS session.

In an embodiment, the request message may be transmitted to the NRF after receiving a policy association response message from the PCF or after receiving a session response message from the MB-UPF.

According to a preferred embodiment, a device of a session management function (SMF) supporting a UE to join a multicast service may comprise a transceiver 910 and a controller 930 coupled with the transceiver. The controller may be configured to receive a join request message for joining the multicast service for the UE, transmit a discovery request message including a multicast/broadcast service (MBS) session ID related to the multicast service to a network function (NF) repository function (NRF), receive, from the NRF, a discovery response message including a multicast/broadcast (MB)-SMF ID mapped to the MBS session ID in response to the discovery request message, obtain information about a MBS session indicated by the MBS session ID from an MB-SMF identified by the MB-SMF ID, and notify a radio access network (RAN) accessed by the UE of information related to the MBS session based on the obtained information.

In an embodiment, the join request message may be received by the SMF from an access and mobility management function (AMF) managing the UE, through a protocol data unit (PDU) session establishment request message, a PDU session modification request message, or a session management non-access stratum (SM NAS) message.

In an embodiment, the controller may be configured to identify whether an MBS session context related to the multicast service is present in the SMF in response to reception of the join request message and determine to transmit the discovery request message when the MBS session context is identified not to be present.

According to various embodiments, a device of a multicast/broadcast session management function (MB-SMF) supporting a UE to join a multicast service may comprise a transceiver 910 and a controller 930 coupled with the transceiver. The controller may be configured to create a multicast/broadcast service (MBS) session having a MBS session ID for providing a multicast service, transmit, to a network function (NF) repository function (NRF), a request message requesting to store an MB-SMF ID identifying the MB-SMF for the MBS session ID, request a multicast/broadcast user plane function (MB-UPF) to set a tunnel to be used to transfer data traffic for the MBS session, and transmit an ingress address for the MBS session received from the MB-UPF to an application function (AF) providing the multicast service.

In an embodiment, the controller may be configured to receive a request message to request to create the MBS session from a network exposure function (NEF) or a multicast/broadcast service function (MBSF) and transmit a response message including the ingress address to the NEF/MBSF.

The methods according to the embodiments described in the specification or claims of the disclosure may be implemented in hardware, software, or a combination of hardware and software.

When implemented in software, there may be provided a computer readable storage medium stoning one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described embodiments of the disclosure, the components included in the disclosure are represented in singular or plural forms depending on the embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise. Further, it should also be noted that in some replacement embodiments, the functions mentioned in the blocks may occur in different orders. For example, two blocks that are consecutively shown may be performed substantially simultaneously or in a reverse order depending on corresponding functions.

Although specific embodiments of the disclosure have been described above, various changes may be made thereto without departing from the scope of the disclosure. Thus, the scope of the disclosure should not be limited to the above-described embodiments, and should rather be defined by the following claims and equivalents thereof.

The invention claimed is:

1. A method performed by a session management function (SMF) for a user equipment (UE) to join a multicast service, the method comprising:

receiving, by the SMF, a join request message for joining the multicast service for the UE, including a multicast/broadcast service (MBS) session ID related to the multicast service;

in case that the SMF has no context information related on the MBS session ID, transmitting, by the SMF, a discovery request message including the MBS session ID to a network function (NF) repository function (NRF);

receiving, by the SMF from the NRF, a discovery response message including a multicast/broadcast (MB)-SMF ID mapped to the MBS session ID, in response to the discovery request message;

obtaining, by the SMF from an MB-SMF identified by the MB-SMF ID, information about an MBS session indicated by the MBS session ID; and transmitting, by the SMF, information related to the MBS session to notify a radio access network (RAN) accessed by the UE based on the obtained information.

2. The method of claim 1, wherein the join request message is received by the SMF from an access and mobility management function (AMF) managing the UE, through a protocol data unit (PDU) session establishment request message, a PDU session modification request message, or a session management non-access stratum (SM NAS) message.

3. The method of claim 1, further comprising:

identifying whether an MBS session context related to the multicast service is present in the SMF in response to reception of the join request message; and determining to transmit the discovery request message when the MBS session context is identified not to be present.

4. The method of claim 1, wherein data traffic of the MBS session is transferred from the RAN to the UE through a point-to-point (PTP) or point-to-multipoint (PTM) bearer.

5. The method of claim 1, wherein the notifying includes accessing a user plane function (UPF) related to the UE to request to create a tunnel for transmitting data traffic of the MBS session to the RAN.

6. A method performed by a multicast/broadcast session management function (MB-SMF) for a user equipment (UE) to join a multicast service, the method comprising:

creating, by the MB-SMF, a multicast/broadcast service (MBS) session having a MBS session ID for providing a multicast service;

transmitting, by the MB-SMF, to a network function (NF) repository function (NRF), a request message requesting to store an MB-SMF ID identifying the MB-SMF for the MBS session ID;

requesting, by the MB-SMF, a multicast/broadcast user plane function (MB-UPF) to set a tunnel to be used to transfer data traffic for the MBS session; and transmitting, by the MB-SMF, an ingress address for the MBS session received from the MB-UPF to an application function (AF) providing the multicast service.

7. The method of claim 6, further comprising:

receiving a request message to request to create the MBS session from a network exposure function (NEF) or a multicast/broadcast service function (MBSF); and transmitting a response message including the ingress address to the NEF/MBSF.

8. The method of claim 7, wherein the request message includes the MBS session ID.

9. The method of claim 6, further comprising:

transmitting a policy association request message including the MBS session ID to a policy control function (PCF); and receiving, from the PCF, a policy association response message including information about a policy related to the MBS session.

10. The method of claim 9, wherein the request message is transmitted to the NRF after receiving a policy association response message from the PCF or after receiving a session response message from the MB-UPF.

11. A device of a session management function (SMF) supporting a user equipment (UE) to join a multicast service, the device comprising:

a transceiver; and a controller coupled with the transceiver, wherein the controller is configured to:

receive, by the SMF, a join request message for joining the multicast service for the UE, including a multicast/broadcast service (MBS) session ID related to the multicast service;

in case that the SMF has no context information related on the MBS session ID, transmit, by the SMF, a discovery request message including the MBS session ID to a network function (NF) repository function (NRF);

receive, by the SMF from the NRF, a discovery response message including a multicast/broadcast (MB)-SMF ID mapped to the MBS session ID in response to the discovery request message;

obtain, by the SMF from an MB-SMF identified by the MB-SMF ID, information about a MBS session indicated by the MBS session ID; and transmit, by the SMF, information related to the MBS session to notify a radio access network (RAN) accessed by the UE based on the obtained information.

12. The device of claim 11, wherein the join request message is received by the SMF from an access and mobility management function (AMF) managing the UE, through a protocol data unit (PDU) session establishment request message, a PDU session modification request message, or a session management non-access stratum (SM NAS) message.

13. The device of claim 11, wherein the controller is configured to:

identify whether an MBS session context related to the multicast service is present in the SMF in response to reception of the join request message; and determine to transmit the discovery request message when the MBS session context is identified not to be present.

14. A device of a multicast/broadcast session management function (MB-SMF) supporting a user equipment (UE) to join a multicast service, the device comprising:

a transceiver; and a controller coupled with the transceiver, wherein the controller is configured to:

create, by the MB-SMF, a multicast/broadcast service (MBS) session having a MBS session ID for providing a multicast service;

transmit, by the MB-SMF to a network function (NF) repository function (NRF), a request message requesting to store an MB-SMF ID identifying the MB-SMF for the MBS session ID;

request, by the MB-SMF, a multicast/broadcast user plane function (MB-UPF) to set a tunnel to be used to transfer data traffic for the MBS session; and transmit, by the MB-SMF, an ingress address for the MBS session received from the MB-UPF to an application function (AF) providing the multicast service.

15. The device of claim 14, wherein the controller is configured to:

receive a request message to request to create the MBS session from a network exposure function (NEF) or a multicast/broadcast service function (MBSF); and transmit a response message including the ingress address to the NEF/MBSF.

* * * * *